United States Patent [19]

Cole, Jr.

[11] Patent Number: 5,019,244
[45] Date of Patent: May 28, 1991

[54] METHOD OF SEPARATING MINERAL PARTICLES BY FROTH FLOTATION

[76] Inventor: Howard W. Cole, Jr., P.O. Box S, Burgin, Ky. 40310

[21] Appl. No.: 287,457

[22] Filed: Dec. 21, 1988

Related U.S. Application Data

[63] Continuation-in-part of Ser. No. 123,569, Nov. 16, 1987, Pat. No. 4,830,737.

[51] Int. Cl.$^5$ .............................................. B03D 1/02
[52] U.S. Cl. .................................. 209/164; 209/168; 209/170
[58] Field of Search ..................... 209/164, 168, 170

[56] References Cited

U.S. PATENT DOCUMENTS

| | | | |
|---|---|---|---|
| 1,279,040 | 9/1918 | Thomas | 209/170 |
| 2,778,499 | 1/1957 | Chamberlain | 209/170 |
| 3,642,617 | 2/1972 | Brink | 210/221.1 |
| 3,749,526 | 7/1973 | Ferrentino | 417/394 |
| 3,811,660 | 5/1974 | Cole, Jr. | 261/18.1 |
| 3,959,131 | 5/1976 | Ramirez | 209/170 |
| 4,176,586 | 12/1979 | Stoll | 91/275 |
| 4,207,202 | 6/1980 | Cole, Jr. | 261/28 |
| 4,213,545 | 7/1980 | Thompson | 222/386.5 |
| 4,226,705 | 10/1980 | Lecoffre | 209/170 |
| 4,229,143 | 10/1980 | Pucker | 417/392 |
| 4,400,220 | 8/1983 | Cole, Jr. | 134/18 |
| 4,420,098 | 12/1983 | Bennett | 222/190 |
| 4,472,271 | 9/1984 | Bacon | 209/170 |
| 4,474,680 | 10/1984 | Kroll | 261/DIG. 26 |
| 4,490,248 | 12/1984 | Filippov | 209/170 |
| 4,498,318 | 2/1985 | Mitter | 222/56 |
| 4,556,523 | 12/1985 | Lecoffre | 209/170 |
| 4,634,430 | 1/1987 | Polaschegg | 417/395 |
| 4,737,272 | 4/1988 | Szatkowski | 209/170 |
| 4,752,383 | 6/1988 | Mckay | 209/170 |
| 4,830,737 | 5/1989 | Cole, Jr. | 209/170 |

FOREIGN PATENT DOCUMENTS

| | | | |
|---|---|---|---|
| 929577 | 10/1980 | U.S.S.R. | 209/170 |
| 210245 | 1/1924 | United Kingdom | 209/170 |

OTHER PUBLICATIONS

Proceedings-First Annual Coal Conference, Pittsburgh, PA 9/17-21/1984 by Yoon and Miller, "A Preliminary Investigation on the Application of Colloidal Gas Aphrons to the Cleaning of Coal".

Proceedings-XIV International Mineral Congress, 10/17-23/1982 Toronto, Canada by Bahr et al., "The Development and Introduction of a New Coal Flotation Cell".

Proceedings of the Technical Program, 5/11-13/1982 by Halsey and Yoon. "Cleaning of Fine Coal by Flotation Using Colloidal Gas Aphrons".

*Primary Examiner*—Stanley Silverman
*Assistant Examiner*—Neil M. McCarthy
*Attorney, Agent, or Firm*—Middleton & Reutlinger

[57] ABSTRACT

A device for controlling the flow of foam which uses a piston-cylinder arrangement to receive foam at the rapid flow rate of a foam generator until the cylinder is substantially full of foam and then to dispense the foam at a lower flow rate by using the piston to gradually push the foam out of the cylinder.

4 Claims, 1 Drawing Sheet

METHOD OF SEPARATING MINERAL PARTICLES BY FROTH FLOTATION

BACKGROUND OF THE INVENTION

This is a Continuation-In-Part of U.S. patent application Ser. No. 07/123,569, filed Nov. 16, 1987. The present invention pertains to a device for controlling the production and flow of foam at low flow rates.

Small bubble foam generators are known, as described in my U.S. Pat. Nos. 3,811,660 and 4,400,220, which are hereby incorporated by reference. These generators produce foam with small bubble size at fairly high rates, which is useful for many applications, such as the use of foam for dust suppression. However, there are some applications in which my small bubble foam is needed at low flow rates.

In accordance with my U.S. Pat. No. 3,811,660, it is necessary to cause the air, water, and surfactant mixture to be subject to "substantial agitation" to produce small bubble foam. This process is performed by causing the mixture to flow at or above a minimum velocity through a pipe, hose or foamer (a unit having "tortuous passages"), or through a foamer as shown in my U.S. Pat. No. 4,207,202 which is hereby incorporated by reference.

Many applications for "small bubble" foam require very small flow rates of the foam. These rates may be less than 1/16 gallon per minute The problem of producing very small flow rates of small bubble foam is two-fold. One is the requirement for metering such small quantities or air, water, and surfactant on a continuous basis, and the second is the requirement for providing "substantial agitation" through some foaming device.

A particular application in which small bubble foam is needed at low flow rates is called froth flotation. Froth flotation, or benefication as it is sometimes called, is a concentration process for separating the fine valuable minerals from their gangue impurities. To effect benefication, mineral-bearing ores are ground in water to form a mixture of mineral particles and non-mineral gangue particles The resulting mixture (water, ore, mineral particles, and gangue particles) is conditioned with various chemicals including froth-producing compounds and agitated in flotation machines which introduce and disperse air in the form of bubbles throughout the pulp to liberate the mineral particles from the gangue particles. The bubbles collect at the surface of the pulp as a froth in which the valuable mineral particles are entrapped. The separated minerals are then either skimmed off or overflow with the froth to concentrate tanks, from which the minerals are then extracted for further processing.

There are many different flotation machines, but all require the formation of some type of air bubbles in the pulp. The size of the air pockets (bubbles) in the pulp is determined by many factors including the air pressure, hole size, agitation of the pulp, etc. In one type of machine, compressed air is introduced under or into the pulp by pertorated pipes or by expelling the air through multihole plates or fine mesh screens.

It is desirable to have the air pockets as small as possible to more efficiently separate the valuable fine mineral particles from the non-mineral gangue particles. However, present commercial equipment cannot produce air pockets much less than 1/64 inch diameter (0.015"); rather, they normally produce much larger bubbles between 1/32 and 1/4 inch diameter.

I have found in my actual measurement that the small bubble foam produced by equipment constructed according to my U.S. Pat. Nos. 3,811,660 and 4,400,220 have bubbles from 50 to 200 micron diameter (0.05 to 0.2 mm) (0.002-0.008 inches) when first ejected from the foam generator. These bubbles exist in a matrix consisting of water and surfactant in the form of highly stressed films surrounding small pockets of air. When this foam is introduced into a tank containing a pulp consisting of ground ore containing fine mineral and non-mineral (gangue) particles, the water film of the mass of bubbles disperses into the water of the pulp, leaving each bubble as a pocket of air surrounded by water. This results in a mass of air pockets which forms a froth which is very effective in entrapping the mineral particles. Thus, by using my small bubble foam the efficiency of the flotation machines is greatly improved.

The density (weight per unit volume) of the water into which the very small air pockets are introduced varies with the number of air pockets per unit volume of water. Therefore, it is necessary to accurately control the amount of air in the form of small air pockets introduced into the flotation machines.

SUMMARY OF THE INVENTION

The present invention provides a device for supplying small bubble foam at low flow rates and a method for enhancing the benefication of minerals using small bubble foam.

The device includes a piston-cylinder arrangement, foam supply means in flow communication with one end of the cylinder and operable in response to the movement of the piston, and fluid supply means in flow communication with the other end of the cylinder and operable in response to movement of the piston. The operation of this device is such as to permit the foam generator to operate at its normal output rate for short intervals, filling up the lower chamber 9 of the cylinder 10, and then to disoharge the foam from the chamber 9 at a lower flow rate, consistent with the needs of the process.

When the device is used for the benefication of minerals, the output from the lower chamber 9 is put into the bottom of the tank to form the froth for entrapping the mineral particles.

BRIEF DESCRIPTION OF THE DRAWING

A better understanding of the present invention will be had upon reference to the following description in conjunction with the accompanying drawing wherein.

DETAILED DESCRIPTION OF THE INVENTION

Figure 1:
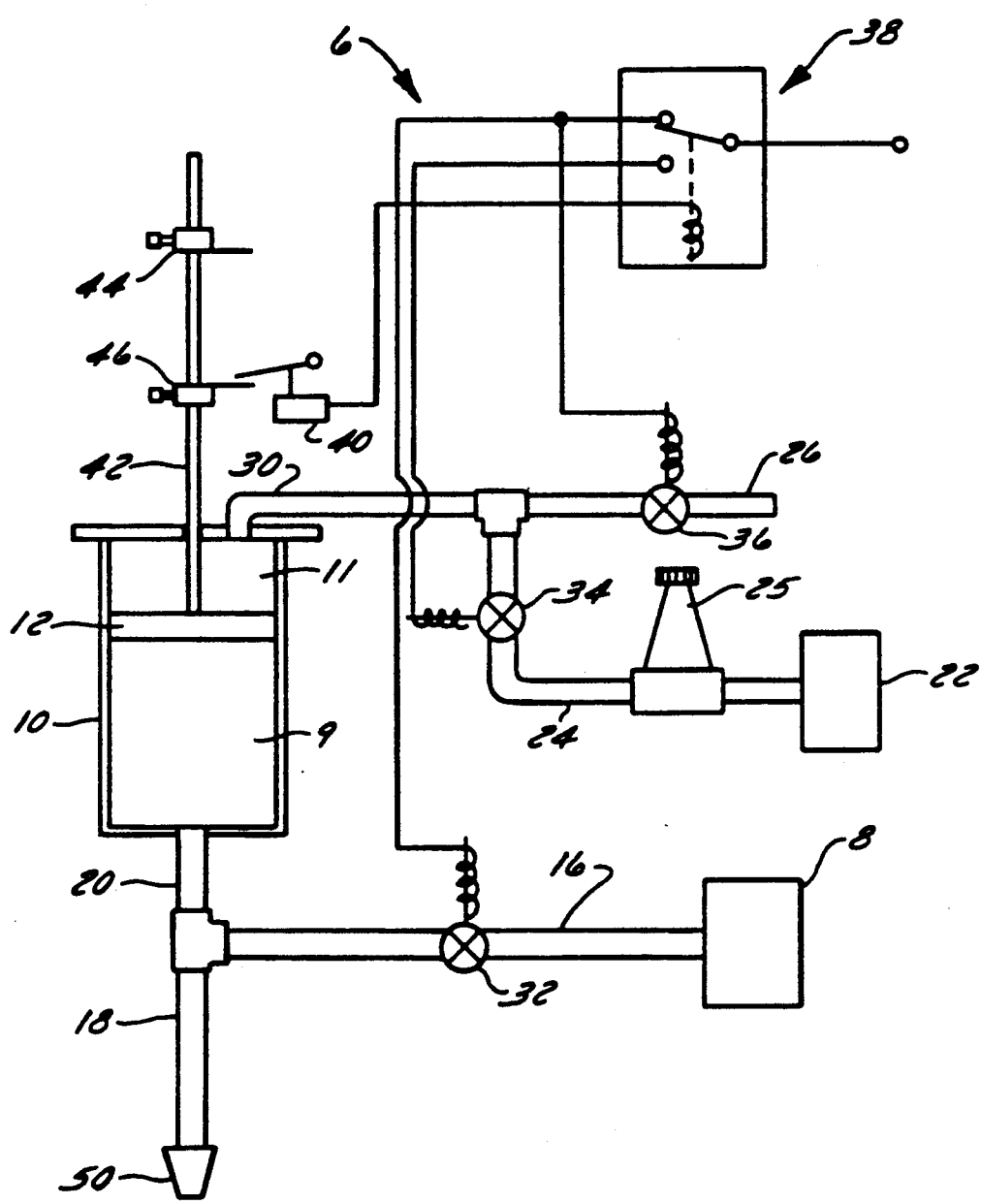
FIG. 1 is a schematic representation of an apparatus of the present invention for controlling the flow rate of foam.

The apparatus shown in FIG. 1 of the drawings provides for a conventionally sized foam generator 8 as described in my U.S. Pat. Nos. 3,811,660, 4,400,220, or 4,207,202 to operate at a normal discharge rate for only short periods of time. Essentially the foam generator fills the lower portion 9 of the cylinder 10 below the piston 12 with small bubble foam under pressure, then shuts off until an externally supplied source of air pressure pushes the piston 12 downward, forcing the small bubble foam out of the cylinder 10 to a downstream operation (not shown) which utilizes the small bubble foam. One preferred use of the apparatus is in a froth flotation or mineral benefication operation, where the foam consists of water, a selected surfactant and air to produce foam bubbles from 50 to 200 microns in diameter. The discharge rate from the cylinder 10 is controlled by the external air pressure applied to the top portion 11 of the cylinder 10.

An apparatus 6 for controlling the flow of foam from a foam generator 8 to a downstream operation is shown in FIG. 1 as including the cylinder 10 and piston 12. The lower portion 9 of the cylinder 10 serves as an expandable container for receiving the foam and is in flow communication with the foam generator 8 by a foam inlet line 16. The lower portion 9 of the cylinder 10 is in flow communication with, for example, a downstream operation by a foam outlet line 18. The foam outlet 18 may include a nozzle 50 as shown to provide some back pressure on the line 18, or the length of the line 18 may itself provide enough back pressure to overcome any inertial and frictional forces in the piston and cylinder. If the foam outlet line 18 is placed at the bottom of a tank for the benefication of minerals, no nozzle is used, because the head of the fluid in the tank provides the back pressure. The foam outlet line 18 and foam inlet line 16 join with a common foam conduit 20 which opens into the lower chamber 9 of the cylinder 10. A source of pressurized gas, preferably pressurized air 22 is in gas flow communication with the upper chamber 11 of the cylinder 10 through an air inlet line 24. A fluid (air) regulator 25 can be positioned in the air inlet line 24. The setting of the air regulator 25 may be used as a means to control the discharge rate of the foam into a froth flotation or mineral benefication process. The upper chamber 11 is also in controlled flow communication with, for example, the ambient environment through an air discharge line 26. The air inlet line 24 and air exhaust line 26 join with a common air conduit 30 which opens into the upper chamber 11.

A first solenoid valve 32 is located in the foam inlet line 16 to control the flow of foam therethrough from the foam generator 8 to the lower chamber 9 of the cylinder 10. A second solenoid valve 34 is located in the air inlet line 24 to control the flow of air therethrough from the air source 22 to the upper chamber 11. A third solenoid valve 36 is located in the air discharge line 26 to control the flow of air being exhausted therethrough from the upper chamber 11. The first, second, and third solenoid valves are each operatively connected to an electrical relay 38. The functioning of the relay 38 is in turn controlled by a two position switch 40. The two position switch 40 is operated between its two positions by a control rod 42 affixed to the piston 12 and extending through a sealed opening in the top end of the cylinder 10 adjacent to the two position switch 40. Two adjustable switch operators 44 and 46 are attached to the control rod 42 outside of the housing 12 and project from the rod 42 in spaced apart relationship. The arms 44, 46 move with the rod 42 as the piston 12 moves up and down. This process is controlled by the movement back and forth of the piston 12 which moves the control rod 42 with the two adjustable switch operators 44 and 46 in a longitudinal direction of the control rod 42 back and forth past the two way switch 40.

In the lower position of the rod 42 corresponding to the lowermost position of the piston 12 which occurs when the foam is expelled from the lower chamber 9, the switch operator 44 has opened the two position switch 40, de-energizing the relay 38. In this condition the first solenoid valve 32 in the input foam line 16 and the third solenoid valve 36 in the air discharge line 26 are both energized to an open position and the second solenoid valve or air supply valve 34 is deenergized to a closed position This allows the Foam Generator 8 to operate at its normal discharge rate to fill the lower chamber 9 with foam through the foam inlet line 16 and common conduit 20. As the lower chamber 9 fills with foam, the piston 12 moves upward, and the air in the upper chamber 11 is expelled through the air discharge line 26 past the open third solenoid valve 36 to atmosphere As the lower chamber 9 is filled with foam, the piston is thereby pushed upward, expanding the chamber 9. When the piston 12 reaches its upper position, the switch operator 46 on the control rod 42 shifts the two position switch 40 to the closed position to energize the relay 38; the first and third solenoid valves 32 and 36 (which were energized) are deenergized to closed positions, and the second solenoid valve 34 in the air inlet line 24 is energized to an opened position. This allows air to enter the upper chamber 11 through the air inlet line 24, and the pressure of the air in the upper chamber 11 acts on the piston 12, pushing it downward and forcing the foam out of the lower chamber 9 through the common conduit 20 and foam outlet line 18, thus completing the cycle. The amount of foam to achieve optimal benefication varies according to many factors, including the type of mineral being separated, the specific gravity of the pulp, the density of the gangue, etc., such that the amount of foam required will usually be left to the empirical judgment of the operator to obtain the desired results.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims.

What is claimed is:

1. A method for the separation of mineral particles from mineral-bearing ore, wherein said ore has been ground into fine particles comprising a mixture of mineral particles and non-mineral gangue particles, and said mixture of fine mineral and gangue particles has been combined with water and chemicals to form a pulp having an upper surface and having a desired specific gravity selected to effect separation of said mineral particles from said gangue, the improved method of separating mineral particles from said pulp of mineral and gangue particles, comprising the steps of:
   producing a quantity of small bubble foam from a mixture of air, water and surfactant forced through a foamer having tortuous passages therein; each of said small bubbles comprising a highly stressed film surrounding an air pocket;
   introducing a selected quantity of said small bubble foam produced by said foamer into an apparatus having a piston-cylinder arrangement including a lower-cylinder chamber for containing said small bubble foam, said piston-cylinder arrangement having metering and relay means to control the quantity and delivery of said small bubble foam introduced into said lower cylinder chamber;
   interrupting said introduction of said small bubble foam into said lower cylinder chamber of piston-cylinder arrangement after a selected quantity of said small bubble foam has been received into said lower cylinder chamber; and forcing said selected quantity of said small bubble foam out of said lower cylinder chamber using said piston-cylinder arrangement to inject said selected quantity of said small bubble foam below the surface of said pulp;

whereby the said surface film of each of said small bubbles of said small bubble foam disperses into said pulp leaving a multitude of air pockets which interact with said pulp to entrap said mineral particles of said pulp and effect separation thereof from said gangue particles.

2. The method of claim 1 wherein said small bubble foam comprises foam having an average bubble size less than 0.015 inches in diameter.

3. The method of claim 1 wherein said small bubble foam comprises foam having a diameter in the range of 0.002 to 0.008 inches.

4. A method for separating mineral particles from mineral-bearing ore, comprising the steps of:
 a. grinding said ore into fine particles comprising a mixture of mineral particles and non-mineral gangue particles;
 b. combining the mixture with water and chemicals to form a pulp having an upper surface and having a desired specific gravity selected to effect separation of the mineral particles from the gangue particles;
 c. forming a quantity of small bubble foam by forcing a mixture of air, water, and surfactant through tortuous passages, said bubbles having diameters in the range of 50 to 200 microns, comprising a highly stressed film surrounding an air pocket;
 d. introducing said quantity of small bubble foam into an injector means for controlling the quantity and flow rate of said small bubble foam entering and exiting therefrom; said injector means comprising: a container for containing said small bubble foam, a sensor means for sensing the volume ofs aid small bubble foam contained within said container, and means to draw said small bubble foam into said container and force said small bubble foam out of said container in response to said sensor means;
 e. injecting a controlled quantity of said small bubble foam from said injector means below the surface of said pulp at a controlled rate of flow;
 f. whereby the surface film of each of the small bubbles disperses throughout said pulp, leaving a multitude of air pockets which interact with the mineral particles of said pulp causing the mineral particles to be separated from the gangue particles due to the difference in the specific gravity of the components.

* * * * *

UNITED STATES PATENT AND TRADEMARK OFFICE
CERTIFICATE OF CORRECTION

PATENT NO. : 5,019,244

DATED : May 28, 1991

INVENTOR(S) : Howard W. Cole, Jr.

It is certified that error appears in the above-identified patent and that said Letters Patent is hereby corrected as shown below:

Column 1, line 62, delete "pertorated" and insert therefor --perforated--.

Column 2, line 41, after "and then to" delete "disoharge" and insert therefor--discharge--.

Column 3, line 11, after "and piston" delete "I2" and insert therefor--12--.

Column 3, line 15, after "of the cylinder" delete "IO" and insert therefor--10--.

Column 3, line 17, after "The foam outlet" delete "I8" and insert therefor--18--.

Column 4, line 13, after "atmosphere" insert--.--.

Column 6, line 13, after "the volume" delete "ofs aid" and insert therefor--of said--.

Signed and Sealed this

Twenty-ninth Day of December, 1992

Attest:

DOUGLAS B. COMER

Attesting Officer

Acting Commissioner of Patents and Trademarks